E. K. CONOVER.
CONTROLLING MECHANISM FOR MOTOR VEHICLES.
APPLICATION FILED JUNE 18, 1908.
1,143,361.
Patented June 15, 1915.
6 SHEETS—SHEET 6.
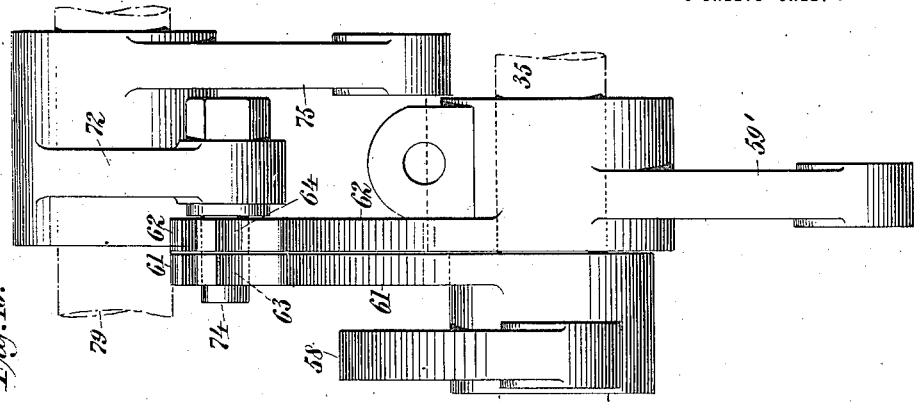
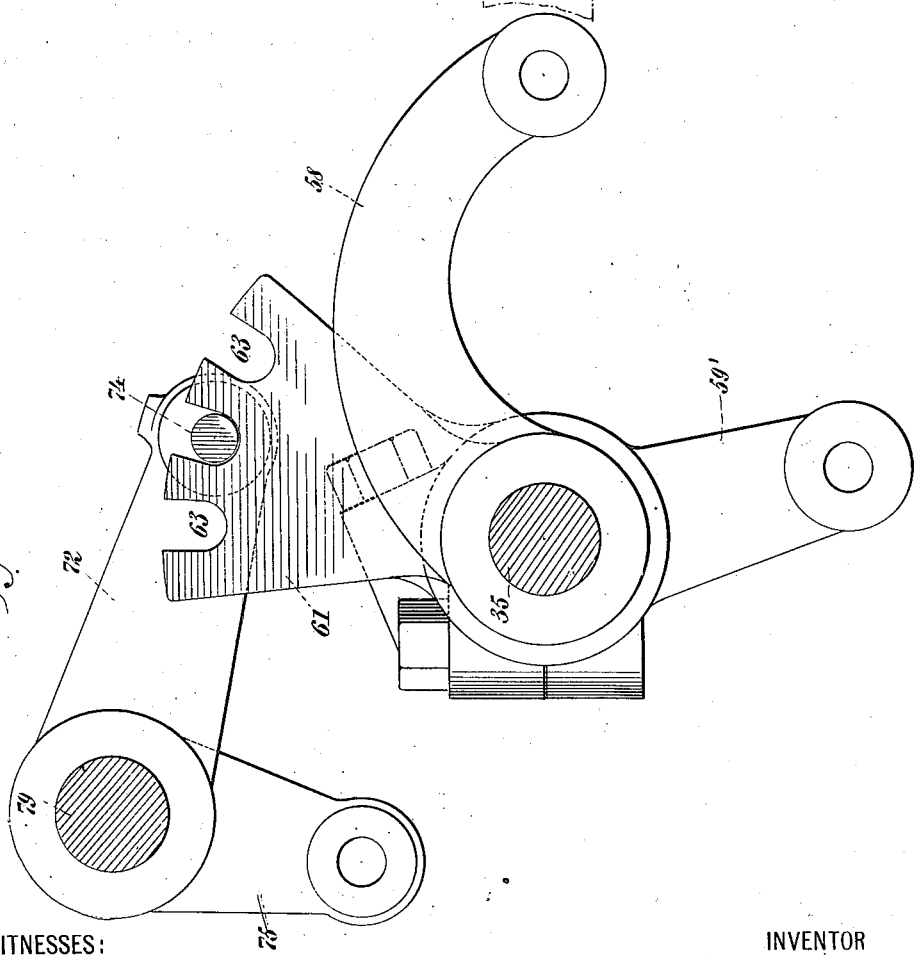
WITNESSES:
INVENTOR
Edwin K. Conover
BY
ATTORNEYS

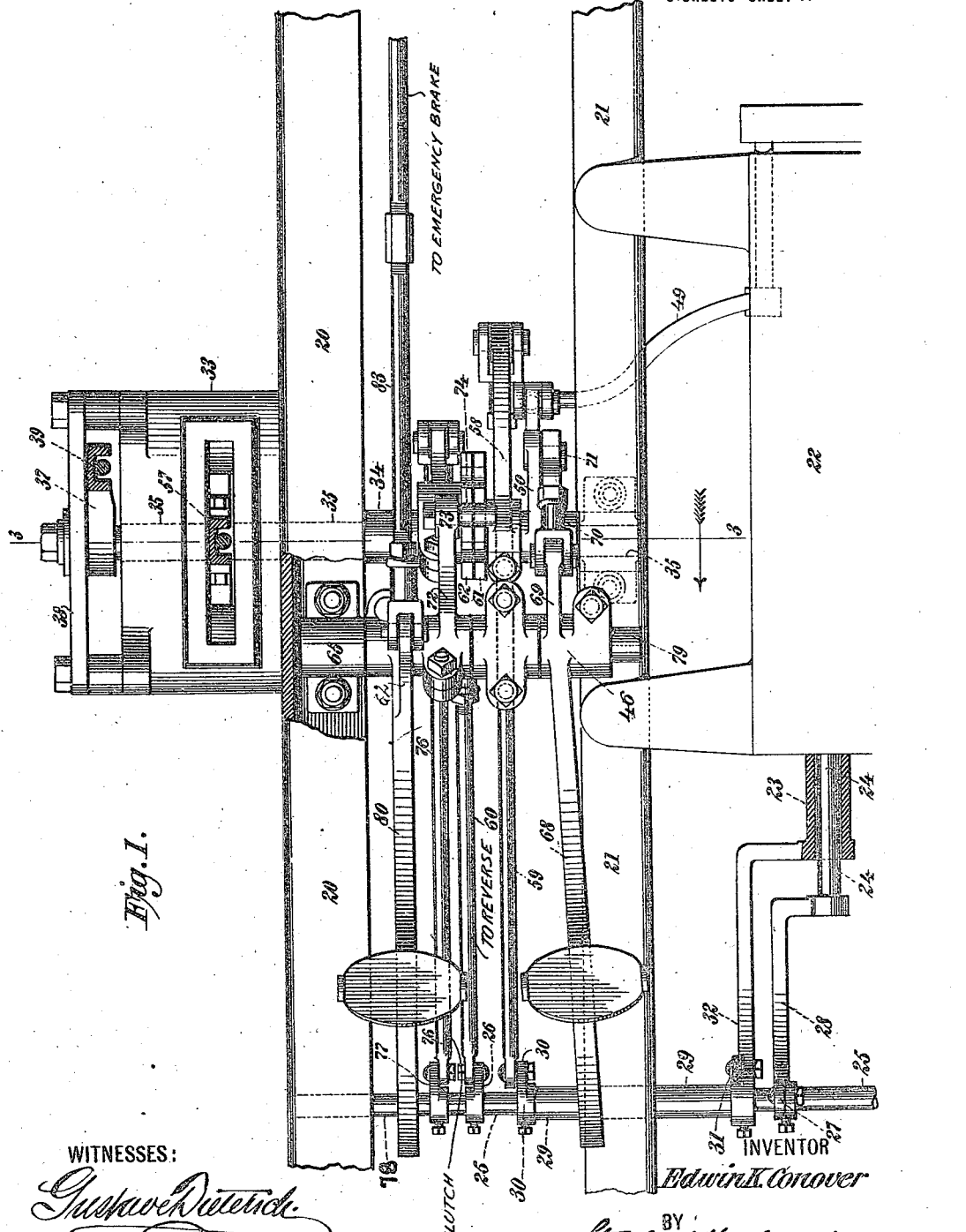

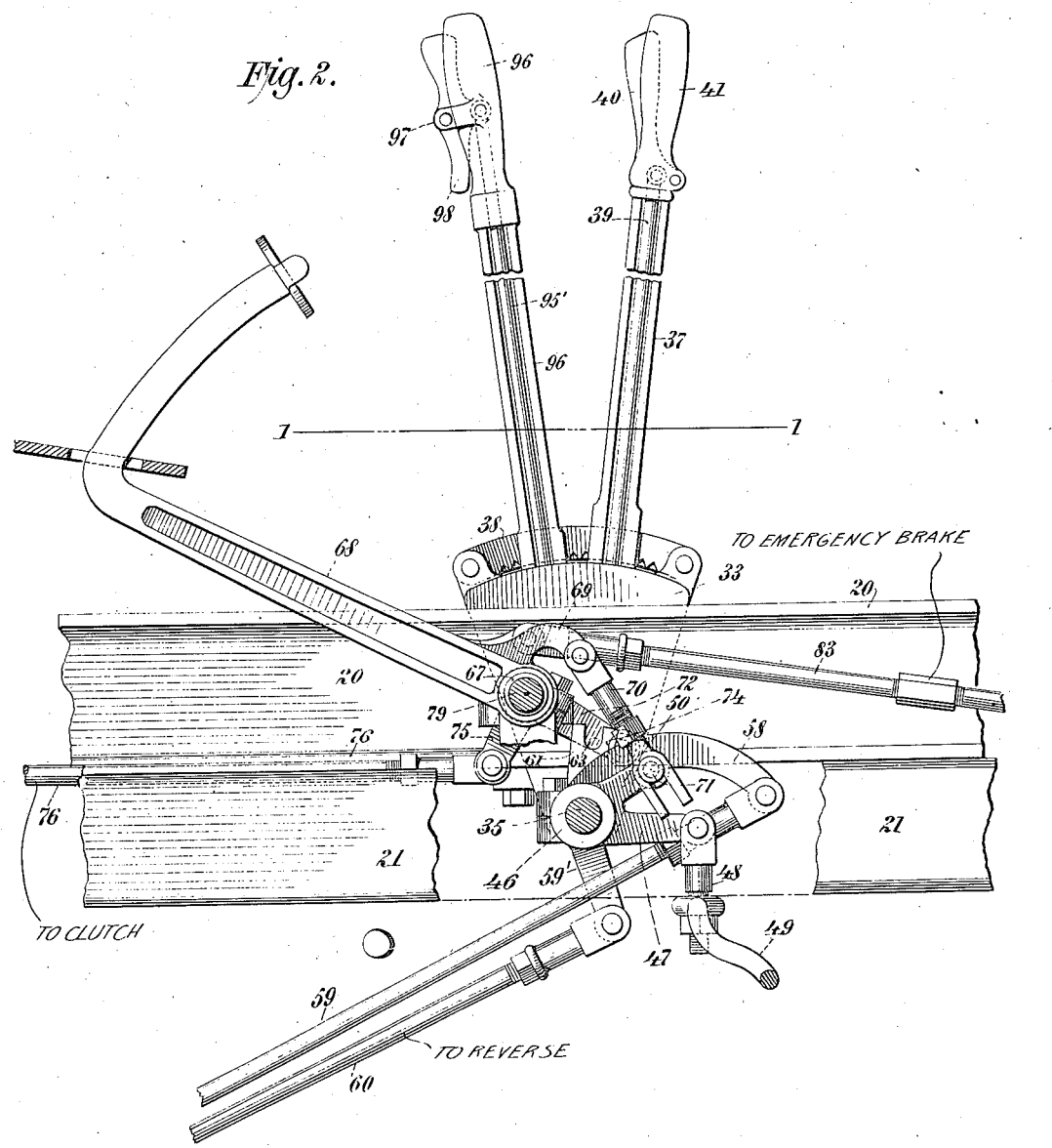

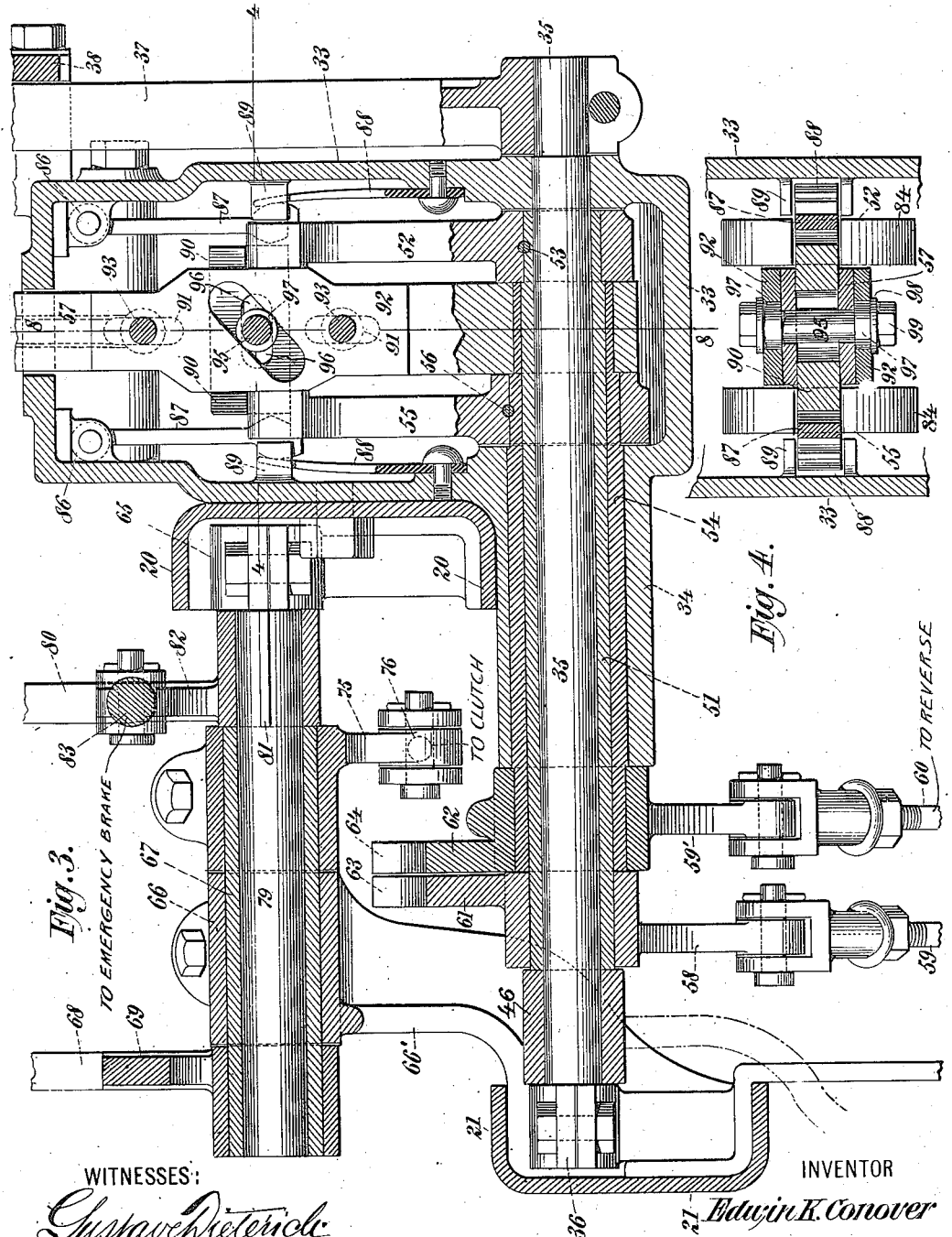

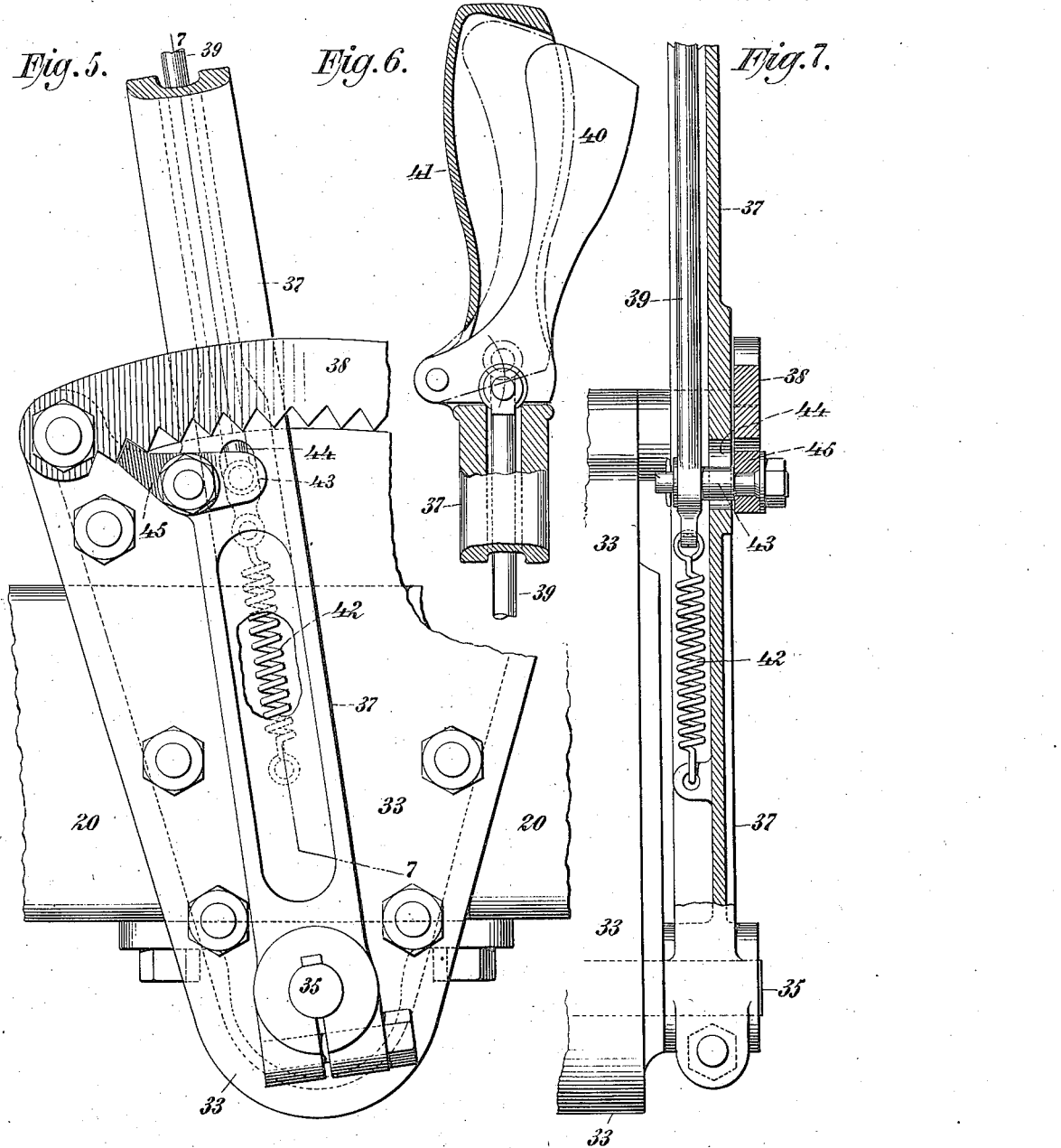

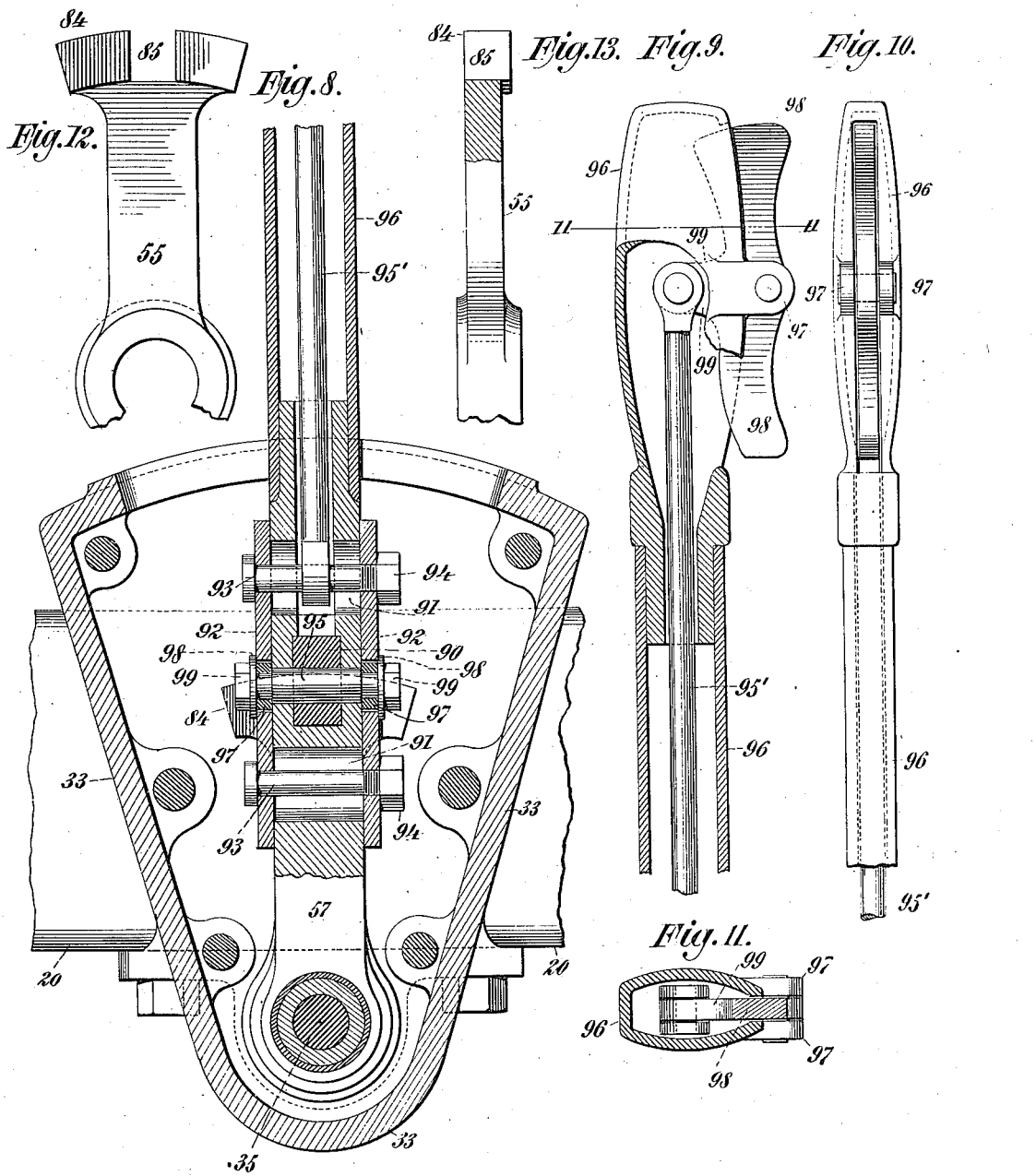

UNITED STATES PATENT OFFICE.

EDWIN K. CONOVER, OF PATERSON, NEW JERSEY, ASSIGNOR TO CONOVER MOTOR CAR COMPANY, OF PATERSON, NEW JERSEY, A CORPORATION OF NEW JERSEY.

CONTROLLING MECHANISM FOR MOTOR-VEHICLES.

1,143,361.     Specification of Letters Patent.     Patented June 15, 1915.

Application filed June 18, 1908. Serial No. 439,364.

*To all whom it may concern:*

Be it known that I, EDWIN K. CONOVER, a citizen of the United States, residing at Paterson, Passiac county, in the State of New Jersey, have invented certain new and useful Improvements in Controlling Mechanism for Motor-Vehicles, of which the following is a full, clear, and exact specification.

My invention relates to improvements in means for controlling the speed and direction of a motor vehicle, and the same has for its object more particularly to provide a simple, efficient and positive means whereby the speed of the vehicle may be increased or diminished or the desired speed or direction of movement at once obtained without requiring the operator to pass successively through the several mechanisms for changing the speed or direction of the travel of the vehicle.

Further, said invention has for its object to provide means for effecting the change of speed or change of direction by means of a single operating lever adapted to move in a fixed plane.

Further, said invention has for its object to provide means for locking the operating lever or handle in operative relation with the supplemental levers of the mechanism.

Further, said invention has for its object to provide means for controlling the operating lever and holding the same locked in operative position while the clutch mechanism is in engagement with the engine in order to prevent any change in the position of the operating lever and the transmission gears while the engine is operatively connected with said transmission.

Further, said invention consists in the various novel details of construction, and in the combination, connection and arrangement of the several parts as hereinafter more fully described and then pointed out in the claims.

In the accompanying drawings wherein like letters of reference indicate like parts, Figure 1 is a plan or top view of a part of a vehicle frame with a traveling mechanism constructed according to, and embodying my invention applied thereto; the latter being shown partly in section on the line 1—1 of Fig. 2; Fig. 2 is a side view thereof looking from the inside of the vehicle frame; Fig. 3 is an enlarged detail section taken on the line 3—3 of Fig. 1 looking in the direction of the arrow; Fig. 4 is a detail transverse section taken on the line 4—4 of Fig. 3; Fig. 5 is a detail side view showing the housing in which the lower end of the controlling lever works, and also the brake lever arranged to work without said housing; Fig. 6 is a side view partly in section showing the upper end of the brake lever seen in Fig. 5; Fig. 7 is a sectional view of the lower end of the brake lever and connected parts taken essentially on the line 7—7 of Fig. 5; Fig. 8 is a vertical section taken on the line 8—8 of Fig. 3, showing the construction of the lower end of the controlling lever; Fig. 9 is a side view partly in section showing the upper portion of the controlling lever seen in Fig. 8; Fig. 10 is an edge view of the upper portion of the controlling lever shown at Fig. 9; Fig. 11 is a transverse section of the same taken on the line 11—11 of Fig. 9; Figs. 12 and 13 are respectively side and edge views showing one of the auxiliary levers which operates in connection with the controlling lever, detached from its shaft, and Figs. 14 and 15 are respectively side and rear views of a device for locking the parts of the mechanism in their positions of adjustment.

In said drawings 20 designates one of the outer side members of a vehicle frame, and 21 one of a part of longitudinal members of the sub frame arranged within the vehicle frame parallel with the side members thereof. Upon the longitudinal members 21 is supported a transmission casing 22 containing the speed changing mechanism providing, for example, forward high, intermediate and low speeds, and reverse. A tubular shaft designated by 23 extends through the forward end of the casing 22 which, when drawn out, will connect the high speed gear with the driving shaft, and, when forced in, will connect the intermediate speed gear, and a solid shaft 24 is shown working within the tubular shaft 23 connecting with the low speed and the reverse, respectively, upon being drawn out or forced in.

A transverse hollow shaft designated by 25 is shown supported upon a shaft 78 which latter shaft has bearings in the vehicle frame members 20. The shaft 25 has a downwardly projecting arm 26 thereon, and an upwardly projecting arm 27 connected by a link 28 with the forward end of the shaft 24 projecting out of the transmission case 22. Upon said transverse shaft 25 is mounted a tubular shaft 29 having at the outer end thereof a downwardly extending arm 30, and at its inner end a downwardly projecting arm 31, adjacent to the arm 27, connected by a link 32 with the forward end of the tubular shaft surrounding, in the present illustration, the shaft 24 of the transmission gear.

Upon the outer side of one of the frame members 20 is bolted a segment-shaped housing 33 having an inwardly extending sleeve 34 at its base. A shaft designated by 35 extends through said housing 33, having its outer end supported in the front wall of said housing, and its inner end extending through said sleeve 34, and its extreme end supported in a bearing 36 secured to the inner longitudinal frame member 21.

A brake lever is illustrated at 37 as having its lower end secured to the outer projecting end of the shaft 35, and arranged to work intermediate the outer side of the housing 33 and a segmental rack 38 secured to said housing 33 at its upper edge. Within said lever 37 is arranged a rod 39 having its upper end pivotally connected to a releasing lever 40 pivotally supported in the handle portion 41 of the brake lever 37, and its lower end connected to one end of a coil spring 42 which is secured at its other end to the brake lever 37 at a point below said rod to hold said rod 39 normally depressed.

43 denotes a stud secured to the lower end of the rod 39 and extending outwardly therefrom through a slot 44 in the brake lever 37 and having its projecting end pivotally connected to one end of a detent or pawl 45 pivoted intermediate its ends upon the outer side of the housing 33 and having its ends upon the outer side of the housing 33 and having its free end adapted for engagement by an upward movement with the teeth on the lower edge of the segmental rack 38 when the rod 39 is held to its depressed position by the spring 42.

Upon the inner end of the shaft 35 is secured a bell crank arm 46, one member of which 47 is secured by a link 48 to an arm 49, which is connected at its other end to an emergency brake shown in Fig. 1. Upon the shaft 35 is mounted a sleeve 51 having upon it, adjacent to its outer end within the housing 33, a supplemental lever 52 which is keyed to said sleeve 51 by a key 53. Mounted upon and surrounding the sleeve 51 is a second sleeve 54 upon the outer end of which within the housing 33 is carried a second supplemental arm 55, which is keyed to said sleeve 54 by a key 56, and mounted free upon the extreme outer end of the sleeve 54 between the supplemental arms 52 and 55 is an operating lever 57. The operating lever is, in the present illustration, mounted for movement in a fixed plane between the supplemental levers, and in the present illustration said supplemental levers are upon axially coincident shafts and the pivoted support for the operating lever is axially coincident with these. Upon the extreme inner end of the sleeve 51 is fast a curved arm 58 to the outer end of which is pivotally connected the rear end of a rod 59 having its forward end pivotally connected to the lower end of the arm 30 upon the transverse tubular shaft 29. Upon the extreme inner end of the sleeve 54 is fast a depending arm 59' to the end of which is pivotally secured the rear end of a rod 60 which is pivotally secured at its forward end to the depending arm 26 upon the transverse tubular shaft 25. Upon the sleeves 51 and 54 respectively are carried upwardly projecting segmental sections 61 and 62 shown integral with said arms 58 and 59', and provided on their upper surfaces with recesses 63, 64. Upon the frame members 20 is provided a bearing 65, and upon the sub-frame member 21 is provided a bearing 66 mounted in a bracket 66' which is secured at its lower end to the sub-frame member 21. Within the bearings 65 and 66 is supported a tubular shaft section 67, upon the inner end of which is keyed a clutch pedal 68 having at its inner end an arm 69, to the end of which is pivotally secured the upper end of a link 70 which has its lower end forked and embracing a stud 71 upon the bell crank member 50 of the bell crank 46 arranged upon the shaft 35. Upon the outer end of the sleeve member 67 is fast a bell crank lever 72 having a horizontal member having its horizontal rearwardly extending member 73 provided with a stud 74, which is adapted to fit into the notches or recesses 63 and 64 of the segmental plates 61 and 62 fast on the sleeves 51 and 54 respectively whereby to hold the various parts of the mechanism locked in position one relatively to another.

The depending arm or member 75 of the bell crank lever 72 is pivotally secured at its lower end to one end of a rod 76, which is pivotally secured at its forward end to the upper end of an arm 77 carried by the clutch shaft 78 upon which the tubular transverse shaft 25 is mounted. Within the sleeve 67 is supported a shaft 79 upon which is fixed intermediate the outer end of the sleeve 67 and the bearing 65 a brake pedal 80 which is keyed to said shaft by a key 81, and provided with an upwardly extending arm 82, to which is pivotally secured the forward end of a rod 83, which is pivotally secured at its rear end to brake mechanism not illustrated.

Referring to the construction of the operating lever 57 and its related parts, it is to be noted that the upper ends of the supplemental arms or levers 52—55 are provided with segmental heads 84 having transverse recesses 85 therein, which recesses extend entirely across said heads 84. Upon the inner sides of the housing 33 above the upper ends of the supplemental levers 52 and 55 are arranged bearings 86—86 in which are pivotally suspended the locking detents 87 having their lower ends so arranged that they shall lie normally within the transverse recesses 85 of the supplemental levers 52—55, and are held spring pressed in that position by leaf springs 88, which are secured at their lower ends upon the inner sides of the housing, and have their upper or free ends in contact with the rear sides of said locking detents 87. The said locking detents 87 are maintained against lateral movement by having their ends disposed intermediate the inwardly projecting lugs 89 arranged upon the inner side of the housing 33. The lower end of the operating lever 57 is provided with a transverse recess in which is disposed the latch 90 which projects beyond the sides of the operating lever 57 at each side thereof, and extends about half way into each of the recesses 85 in the supplemental arms or levers 52, 55.

91, 91 denote longitudinal recesses arranged in the operating lever 57 above and below the recess in which the latch 90 works, and which recesses 91, 91 are disposed at right angles to said latch recess.

92, 92 denote cover plates which are arranged upon opposite sides of the lower portion of the arm 57, and are secured together by means of bolts 93, 93, which extend through the recesses 91. The bolts are provided with nuts 94, 94. 95 denotes a pin, which is firmly fixed to the latch 90 and has its opposite ends extending through horizontal slots 96 disposed in opposite sides of the operating lever 57, and the extreme ends of said pin, which are reduced in diameter are provided with anti-friction rollers 97 disposed within inclined slots 97' in the cover plates 92, 92.

98, 98 denote washers upon the pins 95, and 99 nuts secured upon the ends of the pins 95 above the washers 98.

Within the hollow portion of the operating or hand lever 57 is shown a rod 95' which is pivotally secured at its lower end to the upper of the bolts 93. To the upper portion of the operating lever 57 is secured a hollow handle portion 96 having its forward portion longitudinally slotted and provided with projecting lugs 97' upon which is pivotally mounted an actuating lever or finger grip 98 which is secured to said lugs 97 about midway of its length. It will be noted that this finger grip lever is so connected that each of its ends constitutes a finger grip, and that the operator will always know through his hand in which position the parts are which are controlled by the finger grip, and that the same finger grip lever is capable of performing, by its two positions into which it can be placed by the fingers, two separate functions. The finger grip lever 98 is carried within the hollow handle portion 96 with a rearwardly projecting or transverse arm 99, to which is pivotally secured the upper end of the rod 95'.

The operation of the apparatus is as follows: When the operating lever 57 is in neutral position, which is the position midway between the extremes of its movement, as shown at Fig. 1, the segmental plates 61 and 62 will be held locked together by the transverse pin 74 carried upon the arm 73. When in this neutral position, and the segmental plates 61, 62 are locked together, the clutch will be in engagement, but the transmission will be running idle. In order then to transmit power from the engine to the operating parts of the vehicle and proceed forward at low speed, it becomes necessary to depress the lower part of the actuating lever 98 and thereby raise the rod 95' within the operating lever, and in so doing shift the latch 90 and cause the same to be wholly disengaged from the recess in the upper end of the supplemental lever or arm 52, and to be in full engagement with the supplemental arm or lever 55, and in passing into such full engagement, release the locking detent 87 of its engagement with said supplemental arm or lever 55, thereby rendering the same free to be moved by the operating lever 57. Hereupon the clutch pedal 68 is depressed, and as this occurs the sleeve 67 and arm 73 are partially rotated and thus release the pin 74 of its engagement with the recesses in the segmental plates 61 and 62. This frees the part to move responsive to the supplemental lever which is then in sole engagement with the operating lever, and the operating lever 57 may then be thrown forward, and in so doing carry with it the supplemental arm or lever 55 and partially rotate the sleeve 54, carrying the arm 59' and thereby actuating the rod 60, arm 26, tubular shaft 25, arm 27, link 28 and draw out the shaft 24 connecting the low speed gear of the transmission. As soon as the operating lever 57 has been thrown fully forward, the pressure upon the clutch pedal 68 is released, which will throw the engine into connection with the car and at the same time cause the pin 74 on the arm 73 to re-engage the intermediate recess of the segmental plate 62 and the rear recess of the segmental plate 61, and hold the parts locked to the new position. In order to go in the reverse direction, the clutch pedal 68 should be again depressed and held so until the new position has been arrived at. Hereupon the operating lever 57 is thrown fully back without altering the position of the actuating lever 103 and in the course of this movement the latch 90 remains in engagement with the supplemental lever 55 and the same is carried backward to its extreme position, and thereby the sleeve 54 and the arm 59', rod 60, arm 26, tubular shaft 25, arm 27 and link 28 actuate to force the rod 24 inward to engage the reverse gear. The pressure upon the pedal is again released, by this movement the pin 74 on the arm 73 is caused to reëngage the intermediate recess in the segmental plate 62 and engage the most forwardly of the recesses in the segmental plate 61 and serve to hold the parts locked to the new position. In order to proceed at the second speed ahead, the clutch pedal 68 must be first depressed in order to release the segmental plates from the pin 74 whereupon the operating lever 57 may be brought forwardly to the neutral position. Hereupon the finger grip lever 98 at the upper end of the operating lever 57 is actuated by drawing the upper end thereon inwardly into the handle (which is the reverse of the operation heretofore performed), and thereby cause the rod 95' to be depressed, and in being so depressed cause the inclined slot 97', which is in engagement with the pin 95, to shift the latch 90 from its full engagement with the supplemental arm 55 into full engagement with the supplemental arm or lever 52, and in so doing cause the locking detent 87 to lock the supplemental arm 55 in its neutral position, and release the locking detent 87 of the supplemental arm 52, and permit the said supplemental arm to be drawn backward, and in so doing partially rotate the sleeve 51, arm 58 forcing the rod 59 upward and partially rotating the arm 30, sleeve 29, arm 31, link 32 and force the rod 23 into the casing thereby shifting the second gear into operative position. The pressure upon the pedal 68 is released and the pin 74 of the arm 73 caused to reëngage the intermediate recess in the supplemental plate 61 and engage the forward recess in the segmental plate 62 and hold the parts locked to their adjusted position. To proceed with a high speed ahead, the pedal 68 must be again released in order to release the pin 72 and the arm 73, whereupon the operating lever may be thrown forward to its full extent, and in so doing carry with it the supplemental arm or lever 52, thereby partially rotating the sleeve 51, arm 58 and drawing rearwardly the rod 59, arm 30, partially rotating the tubular shaft 29 drawing forward the arm 31, link 32, and drawing outwardly the tubular rod 23, extending into the transmission casing and bringing the high gear into operative relation. Hereupon the pressure upon the clutch pedal 68 should be released, thereby permitting the pin 74 on the arm 73 to reëngage the intermediate recess in the segmental plate 61 and engaging the rear notch or recess in the segmental plate 62 and thereby hold the parts locked to their adjusted position.

Having thus described my invention, what I claim and desire to secure by Letters Patent is:

1. The combination with a pair of shafts, one within the other, an arm fast on each of said shafts, an operating lever loosely supported by said shafts between said arms, and a bolt for connecting said lever with one or the other of said arms and normally in engagement with both of said arms, said operating lever having at its handle end a bearing, a finger lever pivoted to said bearing and extending above and below the same, a transverse arm carried by said finger lever, and a member connected to said arm and in operative engagement with said bolt, substantially as specified.

2. The combination with a hollow operating lever provided with a hollow handle open at one side and carrying arms adjacent to said opening, a lever pivoted to said arms and extending above and below the same in and a hand grasp, and having an inner arm, and a rod disposed within said operating lever connected to said inwardly extending arm, substantially as specified.

3. The combination with a hand lever provided at its handle end with a bearing, of a finger lever pivoted to said bearing and extending above and below the same, a transverse arm carried by said finger lever, and a member connected to said transverse arm, substantially as specified.

4. In a hand controlled device the combination with an operating lever provided with a handle having bearings disposed in a medial position, a finger lever pivoted to said bearing and extending above and below the same, a transverse arm carried by said finger lever, and operative means connected to said transverse arm, substantially as specified.

5. The combination with a pair of shafts one within the other, the end of the inner shaft extending beyond the end of the outer shaft, an arm fast on the end of each shaft, an operating lever supported on one of said shafts between said arms for movement in a fixed plane, and means for connecting said lever with one or the other of said arms, of power transmitting arms mounted upon the other ends of said shafts, notched sectors carried by said arms, and means for engaging the notches of said sectors for locking the shafts together, substantially as specified.

6. The combination with a transmission mechanism, of movable members for controlling the same, a pair of rock shafts for actuating said members, and notched sectors carried by said rock shafts, means for engaging said notches for locking said rock shafts together, and means adapted to engage with said notch engaging means for actuating a brake, substantially as specified.

7. In a controlling mechanism the combination with a lever, of a pair of arms disposed upon opposite sides thereof, a bolt carried by the lever and movable transversely thereof for engaging said arms, a plate mounted upon said lever for longitudinal movement and provided with a diagonal slot, and projections carried by said bolt and in engagement with said slot, substantially as specified.

8. The combination with a pair of arms and an operating lever mounted concentrically one to the other, the ends of said arms being provided with slots, a locking detent adapted for movement into and out of the slot in each of said arms, a spring for each of said detents for pressing the same into the slot, a bolt carried by the lever and movable transversely thereof and into and out of the slots on said arms, said lever being provided with transverse slots, a pin carried by said bolt and protruding through said transverse slots, plates mounted upon said lever, and means for guiding the same longitudinally thereof, said plates being provided with diagonal slots for actuating said pins, and means for moving said plates longitudinally of the lever, substantially as specified.

9. The combination with a pair of pivoted arms and an operating lever pivoted for movement between said arms, the ends of said arms being provided with slots, a locking detent adapted for movement into said slots when the arms are in neutral position, means for pressing the detents into said slots, a bolt carried by the lever and movable transversely thereof and into and out of the slots on the arms, said lever being provided with transverse slots, a pin carried by said bolt and protruding through said transverse slots, plates mounted upon said lever, and means for guiding the same longitudinally thereof, said plates being provided with diagonal slots for actuating said pins, and means for moving said plates longitudinally of the lever, substantially as specified.

10. The combination with a pair of pivoted arms and an operating lever pivoted for movement between said arms, the ends of said arms being provided with slots, a locking detent adapted for movement into said slots when the arms are in neutral position, means for pressing the detents into the slots, a bolt carried by the lever and movable transversely thereof and into and out of the slots on the arms, said lever being provided with transverse slots, a pin carried by said bolt and protruding through said transverse slots, plates mounted upon said lever, and means for guiding the same longitudinally thereof, said plates being provided with diagonal slots for actuating said pins, means for moving said plates longitudinally of the lever comprising a handle carried by said lever and provided with a bearing, a finger lever pivoted to said bearing and extending above and below the same, a transverse arm carried by said finger lever, and a member connecting said arm and plate, substantially as specified.

Signed at the city of New York, in the county and State of New York, this 19th day of May, nineteen hundred and eight.

EDWIN K. CONOVER.

Witnesses:
LEON A. CARLEY,
A. R. ANGUS.